June 9, 1936.   H. ERNST ET AL   2,043,406
HYDRAULIC SPINDLE STOP
Filed Oct. 1, 1930   4 Sheets-Sheet 1

Inventor
HANS ERNST
CHARLES W. GOODRICH
By HKParsons
Attorney

Patented June 9, 1936

2,043,406

UNITED STATES PATENT OFFICE 2,043,406

HYDRAULIC SPINDLE STOP

Hans Ernst and Charles W. Goodrich, Cincinnati, Ohio, assignors to The Cincinnati Milling Machine Company, Cincinnati, Ohio, a corporation of Ohio Application October 1, 1930, Serial No. 485,764

24 Claims. (Cl. 90—21.5)

This invention relates to milling machines and more particularly to improved control means therefor.

One of the objects of this invention is to provide improved means for interlocking the cutter control and table control of a machine tool, such as a milling machine, whereby the cutter spindle will be automatically stopped during a rapid traverse movement of the table and more particularly during a rapid return movement after a machining operation to thereby prevent marring of the finished work.

Another object of this invention is to provide improved means for preventing movement of the table at a feed rate when the cutter spindle is stopped.

A further object of this invention is to provide a selector that may be positioned either to couple the spindle rotation determinator of a machine tool with the table movement control means thereof for automatic operation thereby or to couple the spindle rotation determinator with an auxiliary table control whereby movement of the determinator to a spindle stopping position will automatically cause stoppage of the table.

An additional object of this invention is to improve the operation of a milling machine by coordinating the controls for the work support and cutter that undesirable movement of one while the other is stopped will be prevented thereby simplifying the operation to such an extent that desirable results may be obtained by practically unskilled operators.

Other objects and advantages of the present invention should be readily apparent by reference to the following specification considered in conjunction with the accompanying drawings illustrative of one embodiment thereof but it will be understood that any modifications may be made in the specific structural details hereinafter disclosed within the scope of the appended claims without departing from or exceeding the spirit of the invention.

Referring to the drawings in which like reference numerals indicate like parts.

Figure 1:
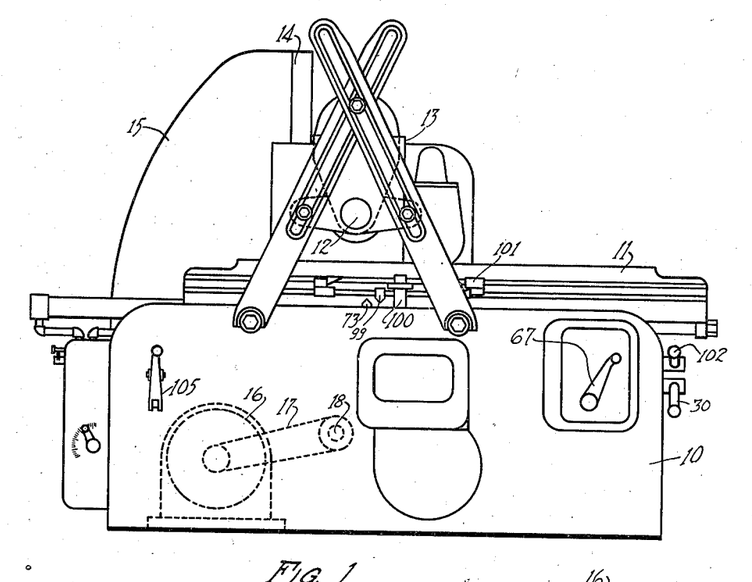
Figure 1 is a front elevation of a machine tool embodying the principles of this invention.
Figure 2:
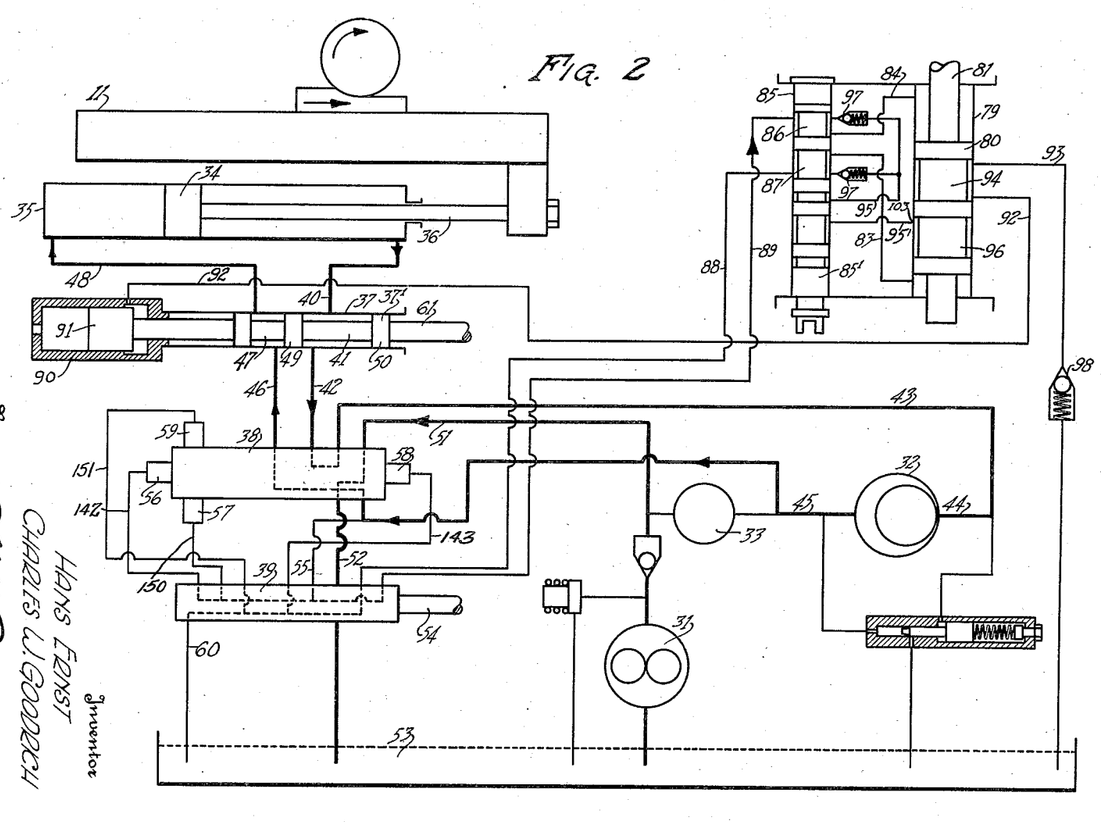
Figure 2 is a diagram of the hydraulic circuit showing the spindle clutch operating cylinder connected with the pilot valve for automatic operation thereby.

In the drawings the reference numeral 10 indicates the base of a milling machine embodying the principles of this invention which has mounted thereon the table 11 adapted to be reciprocated by hydraulic means shown diagrammatically in Figure 2, the explanation of which will appear hereafter. A cutter spindle 12 is journaled in a spindle carrier 13 reciprocably mounted on vertical guides 14 of the upright or column portion 15 of the machine.

Figure 4:
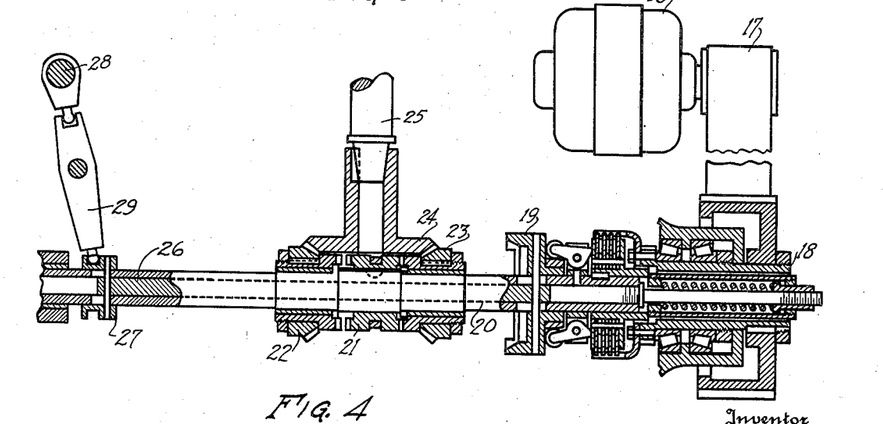
Figure 4 is a detail as viewed on the line 4—4 of Figure 3.
Figure 9:
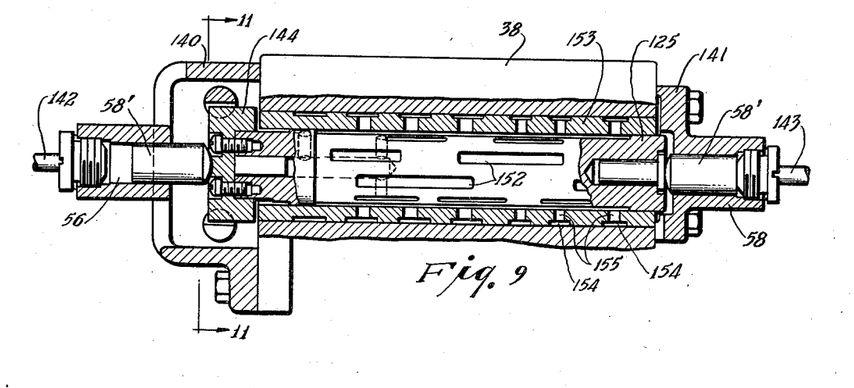
Figure 9 is a longitudinal section through the selector valve.
Figure 10:
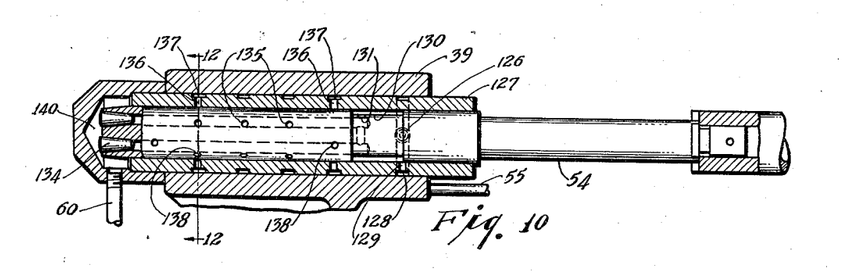
Figure 10 is a longitudinal section through the pilot valve.
Figure 11:
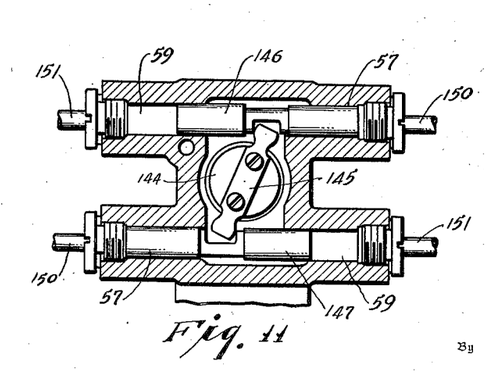
Figure 11 is a section as viewed on the line 11—11 of Figure 9.

A prime mover, such as 16, is mounted in the base of the machine and adapted through suitable means, such as a chain or belt 17, to actuate the main drive shaft 18. As shown in Figure 4, this shaft is provided with a cutter spindle starting clutch 19, which, when moved to engaged position, rotates the hollow shaft 20 and thereby the shiftable clutch member 21 slidably mounted on the shaft between opposed bevel gears 22 and 23 meshing with the common bevel gear 24 fixed to the end of the spindle driving shaft 25. The member 21 is shiftable into clutch engagement with either the bevel gear 22 or 23 to determine the direction of rotation of the cutter spindle and thereby the cutter. The clutch 19 is connected to a shifter rod 26 slidably mounted in the hollow shaft 20 and has secured at one end the spool 27. A longitudinal shaft 28 is operatively connected to the spool 27 through the pivoted member 29 to actuate the clutch upon oscillation of the shaft. This shaft extends beyond the end of the machine and an operating handle 30 is secured thereto forming a manual control lever for the spindle starting clutch.

In addition to operating the spindle the prime mover also drives, through suitable transmission, a plurality of pumps for operating the hydraulic mechanism, these pumps being constantly driven. They include the rapid traverse pump 31, the variable delivery pump 32 and the booster pump 33. An hydraulic motor in the form of a piston 34 and cylinder 35 is provided for reciprocating the table, one of which, such as the piston 34, is connected to the table by a piston rod 36, while the other is fixed to the frame of the machine.

The control elements of the hydraulic circuit herein disclosed include the stop valve 37, the selector valve 38 and the pilot valve 39. The function of these elements and the operation of the hydraulic circuit may be explained briefly as follows. Assuming the parts in the position shown in Figure 2, fluid is being withdrawn from the right end of the cylinder 35 through the conduit 40, cannelure 41 of the stop valve, conduit 42 connecting the stop valve with the selector valve from which the fluid flows through conduit 43 to the in-take port 44 of the variable delivery pump 32. This pump meters the fluid thus received into the channel 45, through the selector valve, channel 46 to the stop valve, cannelure 47 thereof to the conduit 48 and thence into the left end of the cylinder.

It will be seen that this circuit constitutes a locked system and that the table moves at a feed rate determined by the amount of fluid that the variable displacement pump meters from one end of the cylinder. In this circuit the stop valve piston 37', upon movement to the left, functions to close the ports to the conduits 40 and 48 by means of the spools 49 and 50 while the reduced portion 47 serves to short circuit the channels 42 and 46. This serves to lock the fluid in opposite ends of the cylinder thereby stopping the table while permitting short circuiting of the pump which it will be recalled is constantly driven thereby preventing the building up of undue pressures therein.

The pump 32 being a variable delivery pump effects movement of the table at various feed rates depending upon the setting of the pump but in order to effect a rapid traverse movement of the table a separate pump, such as 31, is provided capable of displacing a larger volume of fluid at low pressure. This pump is connected to the selector valve casing through the channel 51. An additional channel 52 leading from the selector valve casing to a reservoir 53 in the base of the machine is provided for connecting the channel 51 with reservoir during feed movements of the table to short circuit the rapid traverse pump.

The selector valve serves to control the rate and direction of movement of the table, reciprocation of the valve plunger simultaneously effecting a change in both rate and direction while a clockwise or counter clockwise oscillation effects a change in rate only.

The pilot valve 39 serves to control the power actuation of the selector valve plunger and is adapted to be dog operated through a rotary and reciprocable plunger 100 cooperating with dogs, such as 101 etc., carried by the table.

Figures 3, 5, 6, 7, 8:
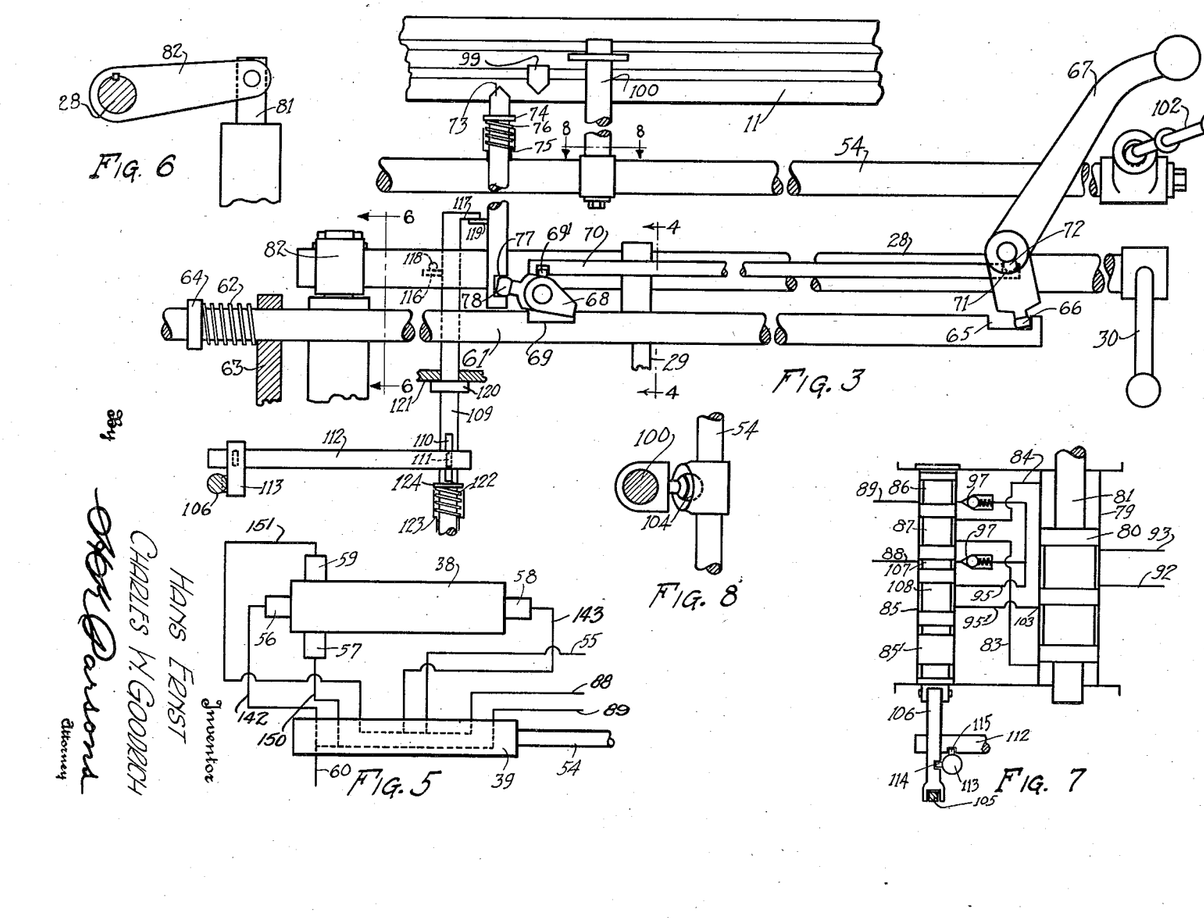
Figure 3 is a detail of the mechanical interlock between the spindle clutch control lever and the stop valve control lever.
Figure 5 is a view of the pilot valve in rapid traverse position.
Figure 6 is a section on the line 6—6 of Figure 3.
Figure 7 is a detail view of a portion of the hydraulic circuit showing the spindle clutch operating cylinder disconnected from the pilot valve and connected with the hydraulic interlock.
Figure 8 is a detail as viewed on the line 8—8 of Figure 3.

The plunger 100 is directly connected to the pilot valve stem 54 by means of a ball and socket joint 104, as shown in Figure 8. Vertical movement of the plunger by dogs on the table will thus effect a rotary movement clockwise or counter clockwise in the stem 54 and connected valve plug while oscillatory movement of the plunger will effect a longitudinal movement of the valve plug. Reciprocable movement of the pilot valve plug effects a reciprocable movement in the selector valve plunger and similarly, an oscillatory movement of the pilot valve plug effects an oscillatory movement of the selector valve plunger.

Figure 12:
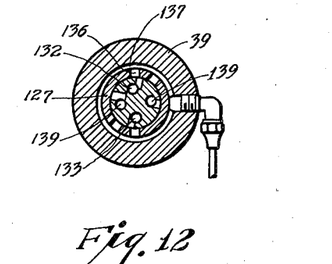
Figure 12 is a section on the line 12—12 Figure 10.

These various movements are effected in the following manner: the pilot valve casing 39 has inlet port 126 which is connected to the constant pressure line 45 through a branch line 55, and a contained distributor bushing 127 which has a cannelure or groove 128 circumferentially connecting with said port. Radial ports 129 formed in this groove conduct the fluid to the wide annular groove 130 formed at the periphery of the valve plug 54 which in turn has radial ports 131 leading to a pair of longitudinal high pressure bores 132 and 133 as shown in Figure 12, which are closed at one end by suitable plugs 134. Distributor passages 135 conduct the fluid to ports 136 formed in annular grooves 137 which are in constant communication with the various pipes, such as 52, 55, etc., threaded in the exterior of the casing. Other passages, such as 138, formed in the valve plunger, communicate with a pair of low pressure or exhaust bores 139 which are opened at the end thereby discharging into chamber 140, which is connected to a reservoir by channel 60. By proper positioning of passages 135 and 138, it will be apparent that the valve plunger may be given definite positions to effect predetermined movements of the selector valve plunger.

The selector valve body is provided with bracket ports 140 and 141 at opposite ends respectively, having opposed cylinders 56 and 58 in each of which is slidably mounted a piston 58'. Coupled with the cylinder at one end is conduit 142 and at the other end is conduit 143. Proper positioning of the pilot valve serves to couple one of these conduits with the power line 45, and the other conduit to the return line 60 thereby shifting the selector valve longitudinally.

The selector valve plunger 125 is provided with a cap 144 bearing a double end rock arm 145, having its termini engaged in slots in double end piston members 146 and 147 supported in cylinders 57, 59. Diagonally opposed cylinders, such as 57 are coupled with conduit 150 and the other pair 59 to conduit 151. These conduits are also coupled to the pilot valve, in which distributor passages may be formed to couple one conduit with the main pressure line 45, and the other to reservoir to effect clockwise or counter-clockwise movement of the selector valve.

The plunger 125 is of general cylindrical form, having various grooves or slots 152 for coupling the ports of valve casing 38, and intermediate bushing 153 having cannelures 154 and ports 155 aligned with the various ports in the valve casing to transmit the actuating medium.

The valve plunger 125 may, if desired, be formed with a central passage 156 communicating as through outlets 157 with the grooves 152. It will now be understood that the rotational movement of the selector valve plunger will line up different grooves 152 with different inlet and outlet ports and that similar longitudinal sliding of the valve member will also couple the different series of ports through the grooves according to whether the actuating medium is to be directed into cylinder 19 for urging the piston in one direction or the other or whether the cylinder is to be connected with the feed pump or rapid traverse pump to effect a change in rate of travel.

The control for the stop valve is shown more clearly in Figure 3 to which reference may now be had. The valve stem 61 is prolonged exterior of the valve and surrounded by a spring 62 which is interposed between a fixed abutment 63 and a collar 64 fixed to the stem whereby the spring acts to constantly urge the valve to a stop position. An elongated notch or recess 65 is provided near the end of the valve stem for receiving the rounded end 66 of the control lever 67. Movement of the control lever 67 to the left serves to move the valve to a running position or in other words, to a position causing movement of the table and for the purpose of holding the parts against the action of the spring a pivoted latch member 68 is provided which engages a recess 69 in the valve stem. To insure positive operation of the latch a lug 69' is provided thereon in engagement with a shifter rod 70 having a notch 71 formed in the other end thereof embracing a lug 72 formed integral with the stop lever. From the drawings it will be observed that the notch 65 has sufficient clearance to permit withdrawal of the latch member 68 without interfering with the end 66 of the stop valve control lever 67. This arrangement also permits dog actuation of the stop valve piston and for this purpose a vertically slidable plunger 73 is provided having fixed thereon a collar 74 between which and a fixed abutment 75 is interposed a spring 76 which tends to hold the plunger 73 in a raised position. The lower end of the plunger is provided with a recess 77 for receiving the ball end 78 of the latch member 68. By the aid of this arrangement a stop dog, such as 99, carried by the table, engaging the end of the plunger 73 will depress the plunger thereby withdrawing the latch and permitting the spring 62 to automatically move the stop valve piston to a stop position. It will also be noted that this arrangement does not interfere in any way with the operation of the manual control lever 67.

As previously mentioned, oscillation of the shaft 28 in opposite directions determines the actuation of the cutter spindle. As viewed from the right of the machine, as shown in Figure 1, counter clockwise movement of the spindle clutch control lever 30 from the clutch engaged position shown will effect engagement of the spindle clutch. For the purpose of controlling the movement of the spindle in desired accordance with the movement of the table an hydraulic spindle stop has been provided which is controlled from the pilot valve. To this end a spindle clutch operating cylinder, such as 79, is provided having a piston 80 slidably mounted therein which has integral therewith a piston rod 81 projecting from the cylinder and adapted to be connected with the shaft 28 through suitable linkage, such as the crank arm 82. Conduits 83 and 84 are connected to opposite ends of the cylinder and lead to a valve casing 85 having a shiftable valve member 85'. With the valve member in the position shown the reduced portions 86 and 87 formed thereon establish connections respectively with the conduits 88 and 89 leading to the pilot valve. The pilot valve plug is so formed that in the position of the parts shown in Figure 2 the channel 89 is connected with the pressure channel 55 while the channel 88 is connected to the outlet 60. This causes pressure to flow through channel 84 to the upper end of the cylinder 79 and discharge from the lower end of the cylinder through the channel 83, thus causing downward movement of the stem 81 which, through linkage 82 previously described, causes a clockwise rotation of the shaft 28 and thereby engagement of the spindle clutch.

In what is known as a one-way cycle, the table is moved to the left at a rapid traverse rate until the work carried thereby is about to be engaged by the cutter, at which time the rate is changed to a feed. At completion of the cut, the table is reversed, and returned to starting position at a rapid traverse rate after which it stops. The selector valve plunger may be suitably ported to produce this cycle and the pilot valve plug also formed to effect the desired sequential movements in the plunger. After the table has stopped it may be started again by shifting the pilot valve plunger to a rapid traverse forward position by the manual control lever 102. This lever is mounted for universal movement at one end of the machine for manually effecting longitudinal, as well as oscillatory, movement to the pilot valve stem 54. In addition the pilot valve plug is provided with ports for the channels 88 and 89 so that when the plug is moved to a quick traverse position, either forward or return, the spindle clutch is disengaged.

During this cycle the table may be stopped and started by the stop valve lever without disturbing the cycle. It is thus seen that the spindle is automatically controlled from the movement of the table, it being automatically stopped when the table is stationary or goes into rapid traverse, and continuously rotated while the table is in feed.

The reciprocating cycle used for reciprocating milling is slightly different in that the selector valve is properly formed to produce a feed rate in each direction as well as a rapid traverse rate. But even in this instance the pilot valve is still formed to effect automatically a stopping of the spindle when moved to a rapid traverse position in either direction.

It may be desirable at times to operate the machine with the spindle clutch under manual control rather than automatic control and suitable mechanism has been provided for disconnecting the spindle clutch operating cylinder 79 from the pilot valve whereby the clutch operating shaft 28 may be manually operated without interference from pressure in opposite ends of the cylinder 79. Such a disconnection will, however, permit independent operation of the table and the cutter which is undesirable for the reason that an unskilled operator might start the table first and cause work carried thereby to engage a stationary cutter causing breakage of the parts.

To prevent such a possibility from occurring an hydraulic interlock is functionally interposed between the table control and spindle control, simultaneously with the disconnection of the clutch spindle control cylinder from the pilot valve. This interlock serves to stop the table whenever the cutter spindle clutch is disengaged and to prevent starting of the table again until the clutch has been reengaged thus insuring that the cutter will always be rotating whenever the table is moving.

To this end an interlock connecting valve 85 is provided for short circuiting the cylinder 79 from the pilot valve and simultaneously connecting the hydraulic interlock with the cylinder 79 which now acts as a valve to control operation of the interlock. The shiftable valve member 85' of the valve 85 is moved from the position shown in Figure 2 to the position shown in Figure 7 by the lever 105 pivotally mounted on the front of the machine and connected to the valve member by the link 106. This new position of the valve, it will be seen from Figure 7, interconnects the channels 83 and 84 by means of the cannelure 87. This permits the fluid in one end of the cylinder 79 to flow freely into the other end thereby permitting free manual oscillation of the lever 28 without interference.

Attention is invited to the fact that while the valve member 85' was in the position shown in Figure 2 that the channel 95 was always under pressure. This is due to the fact that the channels 88 and 89 are alternately under pressure and by means of check valves 97 it is possible to maintain the channel 95 constantly under pressure. Upon movement of the valve member 85' to the position shown in Figure 7 the pressure in the line 95 is still maintained by means of the cannelure 86 which has moved sufficiently to cut-off the line 84 from the channel 89 but not sufficiently to disconnect the channel 89 from its check valve 97. The channel 88 is maintained in communication with its check valve 97 by means of the cannelure 107. The constant pressure channel 95 is now connected with the channel 95' by means of the cannelure 108, which leads to the port 103 in the cylinder 79. With the parts in the position shown in Figure 7 the spindle clutch is engaged and the channel 95' is disconnected from the channel 92. Upon disengagement of the spindle clutch, as by moving the lever 30, the piston 80 will move upward and establish connection between the port 103 and the channel 92. From Figure 2 it will be seen that the pressure will flow through this channel to the interlock cylinder 90 in which is reciprocably mounted the piston 91 attached to the end of the stop valve piston rod 61. This will cause movement of the stop valve piston to the left, short circuiting the channels 42 and 46, and closing the channels 40 and 48 by means of the spools 50 and 49 respectively thereby locking the fluid in opposite ends of the cylinder and stopping movement of the table.

Ordinarily the admittance of hydraulic pressure to the interlock would not effect a closing of the valve due to the latch 68 engaging the depression 69 of the valve stem 61, as previously described. Means have been provided, however, whereby the lever 30 may disengage the latch 68 whenever the valve member 85' is moved to connect the hydraulic interlock in the circuit and comprises a reciprocable and rotatable plunger 109 having a longitudinal groove 110 which receives a lug 111 formed integral on the reciprocable link 112 which in turn is adapted to be actuated by the link 106 through the rotatable member 113. This member is rotated by a lug 114 fitting a notch in the link 106 and has a second integral lug 115 which engages a notch in the link 112 for effecting reciprocation thereof. The lever 109 has a pair of spaced radially projecting fingers 116 and 117 adapted to be moved into the path of the pin 118 projecting from the shaft 28 and the pin 119 projecting from the plunger 73 respectively. A collar 120 fixed to the plunger 109 is held in engagement with a fixed stop 121 by means of a spring 122 surrounding the plunger 109 and interposed between a fixed stop 123 and a collar 124 fixed to the plunger. From the description it should now be apparent that the plunger 109 is maintained normally in a vertically raised position and will be moved downward from that position upon clockwise rotation of the shaft 28 by the pin 118 engaging the projecting finger 116. Simultaneously with this downward movement the projecting finger 117 will engage the projecting portion 119 of the stop plunger 73 thereby depressing the plunger and causing disengagement of the latch 68. Upon movement of the shaft 28 in the opposite direction the spring 122 will return the parts to normal position. Means have thus been provided for effecting disengagement of the latch 68 whenever the clutch for the cutter spindle is manually disengaged thereby permitting the hydraulic interlock to function.

Upon movement of the lever 30 upwards to disengage the cutter spindle clutch the latch 68 will be disengaged, as previously explained, and the channel 92 will be connected with the port 103. Upon movement in the opposite direction the plunger 109 will return to the position shown thereby permitting the spring 76 to move the stop plunger 73 upward and cause engagement of the latch 68 whenever the stop valve plunger is moved to the right to effect movement of the table and will also cause the piston 80 to move downward to the position shown in Figure 7 thereby connecting the channel 92 with the exhaust channel 93 which leads to the reservoir. A low pressure check valve 98 is placed in the channel 93 for the sole purpose of maintaining the channel 92 full of oil thereby insuring more proper response upon movement of the piston 80 upward. Upon movement of the interlock connecting valve 85' to its position shown in Figure 2 the plunger 109 will be rotated by the link 106 through the intervening linkage thereby moving the fingers 116 and 117 out of the plane of movement of the parts 118 and 119.

From the foregoing description it will now be evident that an automatic control for the cutter spindle of a machine tool has been provided which is interconnected with the table control to insure that the cutter is rotating while the table of the machine is feeding and that the cutter is stationary when the table is moving at a rapid traverse rate in either direction. This automatic control may be disconnected at will from the table control to permit manual control of the spindle in which case an interlock is automatically connected between the manual control for the cylinder and the stop valve for the table to insure that the table will be stopped whenever the clutch for the cutter spindle is disengaged and that the table will be maintained stationary until the cutter spindle clutch is reengaged.

That which is claimed is:

1. A milling machine having a support, a table reciprocably mounted thereon, a cutter rotatably mounted adjacent thereto, hydraulic means for reciprocating the table, a pilot valve control for said means for determining both the rate and direction of movement of the table, an hydraulically actuated starting clutch for the cutter, and means in the pilot valve for controlling the actuation of the clutch in accordance with the rate of movement of the table.

2. A machine tool having a reciprocating table, a cutter spindle supporting a cutter in cooperative relation thereto, a prime mover, a transmission extending from the prime mover to the spindle including a starting clutch, hydraulic means for actuating said clutch, hydraulic means for translating said table, and a dog actuated pilot valve for controlling both of said means, said valve being movable to one position to effect rotation of the cutter and translation of the table at a feed rate and dog actuated to a second position to effect translation of the table in a reverse direction at a rapid traverse rate with the cutter stationary.

3. A milling machine having a table and a cutter, an hydraulic motor for effecting reciprocation of the table, a pump, in-take and delivery channels extending from said pump to the motor, valve means in said channels for determining the actuation of the table, a prime mover, a clutch for connecting the cutter with the prime mover for actuation thereby, manual means for actuating said clutch, and an interlock effective on said valve means upon disengagement of the clutch to thereby stop the table.

4. A milling machine having a support and a reciprocating table thereon, a cutter rotatably mounted in cooperative relation to the table, hydraulic means for effecting reciprocation of the table including a piston and cylinder one of which is attached to the table and the other to the frame of the machine, a source of hydraulic pressure including a variable delivery pump, in-take and delivery channels connecting said pump to the cylinder, valve means in said channels adapted to short circuit the pump and thereby prevent movement of the table, and hydraulic means controlled by the stoppage of the cutter spindle to effect movement of the valve means to a short circuiting position.

5. A milling machine having a reciprocating table, hydraulic means for effecting said reciprocation including a piston and cylinder one of which is attached to the table, a variable delivery pump, in-take and delivery channels extending from the pump to the cylinder, a stop valve in said conduits for short circuiting the pump and thereby preventing movement of the table, manual means for moving the stop valve to a running position, a latch for maintaining the valve in said position, hydraulic means for urging the stop valve to a closed position, and a single control effective to release said latch and to cause hydraulic actuation of the stop valve to a closed position.

6. A milling machine having a reciprocating table, a cutter spindle, a prime mover, a transmission extending from the prime mover to the cutter spindle to effect rotation thereof, a starting clutch in said transmission, hydraulically actuated control means for said clutch, hydraulic means for effecting reciprocation of the table including a control valve, means to control the movement of the clutch from the valve, and additional means to disconnect the clutch control means from the control valve for independent actuation thereof.

7. A milling machine having a table and a rotating cutter, a prime mover, a clutch for connecting the cutter spindle with the prime mover, a clutch control, hydraulic actuated means for effecting reciprocation of the table including a stop valve having an actuating cylinder, a source of pressure, and means controlled by the spindle clutch control for coupling the source of pressure with the stop valve cylinder to prevent movement of the table while the cutter is stationary.

8. A milling machine having a table and a cutter, a prime mover, a transmission extending from the prime mover to the cutter including a clutch, a control lever therefor, hydraulic means for reciprocating the table, a stop valve control means therefor, hydraulic actuated means for moving the valve to stop movement of the table, additional valve means having a pressure port controlled by the clutch lever for coupling pressure with said hydraulically actuated means upon movement to disengage the clutch, a pair of channels which are alternately under pressure, a check valve for connecting each channel with said port whereby the port is constantly under pressure, and means to prevent movement of the stop valve to cause actuation of the table until the clutch has been reengaged.

9. A milling machine having a table and a cutter spindle, hydraulic actuating means for the table including a rate and direction determining valve, power actuating means for the spindle including a starting clutch, dog actuated control means for the valve, manual control means for the clutch, means coupling said manual control means with the dog actuated control means for automatic operation thereby, auxiliary valve control means for said hydraulic actuating means, and means to simultaneously disconnect the coupling means and connect the manual control means in interlocking relation with the auxiliary control means.

10. A milling machine having a reciprocating table and a rotary cutter, hydraulic means including an hydraulic motor and a source of pressure for reciprocating the table, power means for rotating the cutter including a starting clutch having a fluid operable actuator therefor, a dog actuated control valve for said hydraulic means, auxiliary control valve for said hydraulic means in serial relationship with the first named valve, means to selectively couple the clutch actuator with said dog actuated control valve for automatic operation thereby; or in interlocking relation with said auxiliary control valve to prevent movement of the table while the clutch is disengaged.

11. A milling machine having a reciprocating support and a stock removing cutter rotatably mounted in cooperative relation thereto, hydraulic means for selectively causing relative movement of the support with respect to said element at a stock removing rate or at a non-stock removing rate, a source of power, transmission means including a clutch for coupling the cutter with the source of power for actuation thereby, an hydraulically actuated shifter for said clutch, and means interconnecting the clutch shifter with said hydraulic means whereby said cutter will be automatically coupled with the source of power during movement at a stock removing rate and uncoupled during movement at a non-stock removing rate.

12. A milling machine having a reciprocating table and a rotary cutter, hydraulic means for reciprocating the table at a stock removing rate or at a non-stock removing rate, power means for rotating the cutter including a starting clutch having an actuator therefor, a trip control for said hydraulic means to determine the rate and direction of movement of the table, an auxiliary control therefor, means to selectively couple the clutch actuator with said trip control for automatically effecting rotation of the cutter during movement of the table at a stock removing rate or non-rotation of the cutter during movement at a non-stock removing rate; or in interlocking relation with said auxiliary control to prevent movement thereof during disengagement of the clutch.

13. A milling machine having a table and a cutter spindle, power means for rotating the cutter spindle including a starting clutch, hydraulic means for translating the table with respect to the cutter, control means therefor including a shiftable valve, means to move the valve to a position causing translation of the table, latch means for maintaining the valve in said position, resilient means urging said valve to table stop position, means to simultaneously disconnect the clutch and release the latch means whereby the rotation of the cutter spindle will be stopped and the valve returned to effect stoppage of the table, and hydraulic means simultaneously effective to maintain the valve in returned position until re-engagement of the clutch.

14. A milling machine having a table and a cutter spindle, hydraulic means including an hydraulic motor and a source of pressure for reciprocating the table, power actuable means for rotating the cutter spindle including a motion interrupting clutch, trip control means for determining the deliverance of pressure to the motor, manual control means for said clutch, auxiliary pressure control means for said motor, means selectively shiftable to one position to connect said manual control means with said trip control means whereby the rotation of the cutter spindle will be automatically controlled from the table and to another position to connect said manual controls with said auxiliary control means, whereby movement of the table is dependent upon the actuation of the cutter.

15. A machine tool of the class described having a table and a cutter spindle, hydraulic means for reciprocating the table, a source of power, clutch means for coupling the spindle with said source for actuation thereby, manual control means therefor, a main valve and an auxiliary valve for independently controlling said hydraulic means to determine movement of the table, means selectively shiftable to connect the clutch control means with the main valve for automatic operation thereby or to connect said clutch control means with the auxiliary valve for automatic operation thereof, latch means normally operative to maintain the auxiliary valve in a running position, means simultaneously movable into position by the selective means during its last named shifting movement to effect release of said latch means upon movement of the manual control means to a clutch disengaging position thereby permitting movement of the auxiliary valve to stop the table.

16. A milling machine including a rotatable cutter spindle, a work table, power actuated means for rotating said spindle including a motion interrupting clutch, power actuated means including a piston and cylinder for effecting reciprocation of the table transversely of the spindle at selected feed and rapid traverse rates, a fluid operable device for shifting said clutch including a piston and cylinder, a source of pressure therefor, a valve for determining the flow of pressure to said cylinders, and trip means movable with the table for positioning the valve in accordance with the rate of movement of the table whereby the spindle will be rotated during feed movement and stopped during the rapid traverse movement of the table.

17. A milling machine having a reciprocating table, a rotatable cutter spindle, a spindle train including a motion interrupting clutch, a table transmission including a rate and direction determinator, a fluid operable device for shifting said clutch, a source of pressure, a valve for determining the flow of pressure to said device, and a common determinator actuating mechanism operable by dogs carried by the table for changing the feed rate of the table in one direction with the spindle running to a quick traverse rate in the opposite direction with the spindle stopped.

18. A milling machine having a rotatable cutter spindle and a reciprocable work table, a spindle transmission including a motion interrupting clutch, a table transmission for effecting movement of the table transversely of the spindle, a common prime mover for the table and spindle transmissions, a fluid operable device for shifting said clutch, a source of pressure, a valve for determining the flow of pressure to said device, a single trip controlled mechanism effective upon the transmission for determining movement of the table in one direction at two different rates, and means operatively coupling the valve to said mechanism whereby the cutter will be stopped during movement at one of said rates.

19. A milling machine having a reciprocable table, a cutter spindle, a prime mover, a transmission including a motion interrupting clutch extending from the prime mover to the cutter spindle to effect rotation thereof, a fluid operable device for shifting said clutch, an hydraulic circuit for shifting said table including a control valve and a source of pressure, means operable by the valve in accordance with the rate of movement of the table for delivering fluid to said clutch shifter, and additional means for disconnecting the shifter from said valve to permit independent actuation of the clutch.

20. A machine tool having a reciprocating table, a cutter spindle supporting a cutter in cooperative relation to the table, a prime mover, a transmission extending from the prime mover to the spindle including a starting clutch, power operable means for shifting said clutch, a branch transmission actuated by the prime mover and operable for translating the table at different rates, and a dog actuated trip plunger associated with the table for determining the rate of movement thereof and the position of said clutch, said plunger having one position to effect rotation of the cutter and translation of the table in one direction at a feed rate, and a second position to effect translation of the table in a reverse direction at a rapid traverse rate with the cutter stationary.

21. A milling machine having a reciprocating table, a rotary cutter, a table transmission including a source of power for effecting relative transverse movement between the table and cutter, a second transmission including a motion interrupting clutch driven from said power source for rotating the cutter, an actuator for said clutch, a first trip actuated control means in the table transmission for determining the rate and direction of movement thereof, a second control means in serial relationship with the first control means for determining movement of the table, and means to couple the clutch actuator selectively with the first control means whereby the cutter will be rotated in accordance with the rate of movement of the table or in interlocking relation with the second control means to prevent movement of the table when the cutter is stopped.

22. In a milling machine having a tool support and a work support, the combination with a tool spindle journaled in said tool support, of power operable means for rotating said spindle including a control clutch, fluid operable means for effecting relative movement between said supports including a first pump for effecting said movement at a slow rate, a second pump for effecting said movement at a relatively fast rate, a selector valve alternately connecting the pumps for effecting said relative movement, a fluid control circuit for determining the shifting of said valve including a pilot valve, and fluid connections between said pilot valve and said clutch for determining the position of the clutch in accordance with the rate of said relative movement.

23. In a machine tool having a rotatable tool support, power operable means for rotating said spindle including a control clutch and a work support relatively movable with respect to said spindle at relatively slow or feeding rates or at a quick traverse rate, the combination of means for positioning said clutch in accordance with the rate of said relative movement including a feed pump, a rapid traverse pump, a pilot controlled valve mechanism for determining the coupling of said pumps including a pilot valve and means operable by the pilot valve to effect engagement of said clutch when positioned to connect the feed pump for effecting said relative movement and to disengage said clutch when in a position to effect coupling of the rapid traverse pump for said relative movement.

24. In a machine tool having a rotatable spindle and a work support the combination of power operable means for rotating said spindle including a motion interrupting clutch, fluid operable means for effecting relative movement between the spindle and work support including a feed pump, a selector valve for coupling the pump to effect said relative movement, a pilot circuit for shifting said valve including a pilot valve, means to divert part of the delivery of said feed pump for supplying operating fluid to said pilot valve and branch lines from said pilot valve for determining fluid operation of said clutch.

HANS ERNST.
CHARLES W. GOODRICH.